(12) United States Patent
Zhao et al.

(10) Patent No.: US 12,217,337 B2
(45) Date of Patent: Feb. 4, 2025

(54) METHOD, APPARATUS, DEVICE, SYSTEM AND STORAGE MEDIUM FOR COLLECTING SPATIOTEMPORAL BEHAVIORS AND GENERATING A SPATIOTEMPORAL BEHAVIOR TRACK

(71) Applicant: KINGFAR INTERNATIONAL INC., Beijing (CN)

(72) Inventors: Qichao Zhao, Beijing (CN); Ran Yang, Beijing (CN)

(73) Assignee: KINGFAR INTERNATIONAL INC., Beijing (CN)

( * ) Notice: Subject to any disclaimer, the term of this patent is extended or adjusted under 35 U.S.C. 154(b) by 160 days.

(21) Appl. No.: 18/087,875

(22) Filed: Dec. 23, 2022

(65) Prior Publication Data

US 2023/0126200 A1  Apr. 27, 2023

Related U.S. Application Data

(63) Continuation of application No. PCT/CN2022/095697, filed on May 27, 2022.

(30) Foreign Application Priority Data

Oct. 8, 2021  (CN) .......................... 202111172921.2

(51) Int. Cl.
*G06T 11/20* (2006.01)
*G06F 3/01* (2006.01)

(52) U.S. Cl.
CPC ............ *G06T 11/203* (2013.01); *G06F 3/013* (2013.01); *G06F 3/015* (2013.01)

(58) Field of Classification Search
None
See application file for complete search history.

(56) References Cited

U.S. PATENT DOCUMENTS

2017/0003750 A1\* 1/2017 Li ........................... G06F 3/017
2018/0227470 A1   8/2018 Rongrenn
(Continued)

FOREIGN PATENT DOCUMENTS

CN  107239144 A  10/2017
CN  109271030 A   1/2019
(Continued)

*Primary Examiner* — Michael J Cobb
(74) *Attorney, Agent, or Firm* — Cooper Legal Group, LLC (57) ABSTRACT

The present application relates to a method, apparatus, device, system and storage medium for collecting spatiotemporal behaviors and generating a spatiotemporal behavior track. The method includes: obtaining a first time series containing a plurality of sampling points; taking one sampling point as a current sampling point; setting a window time, and finding a first sampling point and a last sampling point within the window time; taking a first position as a center of a circle, which is a center point of the reality display device corresponding to the current sampling point, and calculating an angular speed between the first sampling point and the last sampling point; if the angular speed is greater than a preset angular speed threshold, taking the current sampling point as a displacement point; processing the plurality of sampling points as described above to obtain a second time series; drawing a moving track map.

13 Claims, 5 Drawing Sheets

(56) References Cited

U.S. PATENT DOCUMENTS

| 2022/0206575 A1* | 6/2022 | Zhao | G06F 3/013 |
| 2023/0068927 A1* | 3/2023 | Choi | G06F 3/012 |

FOREIGN PATENT DOCUMENTS

| CN | 111265225 A | 6/2020 |
| CN | 111309144 A | 6/2020 |
| CN | 111983210 A | 11/2020 |
| CN | 114022642 A | 2/2022 |
| WO | 2021147905 A1 | 7/2021 |

* cited by examiner

METHOD, APPARATUS, DEVICE, SYSTEM AND STORAGE MEDIUM FOR COLLECTING SPATIOTEMPORAL BEHAVIORS AND GENERATING A SPATIOTEMPORAL BEHAVIOR TRACK

CROSS-REFERENCE TO RELATED APPLICATION

The present application is a continuation of PCT application No. PCT/CN2022/095697, filed on May 27, 2022, which claims priority to China patent application No. 202111172921.2, filed on Oct. 8, 2021. The entireties of PCT application No. PCT/CN2022/095697 and China patent application No. 202111172921.2 are hereby incorporated by reference herein and made a part of this specification.

TECHNICAL FIELD

The present application relates to a field of spatiotemporal analysis, in particularly, relates to a method, apparatus, device, system and storage medium for collecting spatiotemporal behaviors and generating a spatiotemporal behavior track.

BACKGROUND ART

A spatiotemporal behavior data of a subject in a virtual reality scene or a mixed reality scene is an important indicator to study whether the virtual reality scene or the mixed reality scene meets user expectation. Therefore, it has great significance for expanding functions of a virtual reality technology or a mixed reality technology that introducing the spatiotemporal analysis into the virtual reality technology or the mixed reality technology. In order to analyze a spatiotemporal behavior in the virtual reality, it needs to be supported by a scientific evaluation indicator and an objective quantified data, and to obtain a moving track of the subject in the virtual reality scene or the mixed reality scene, so as to analyze a user satisfaction in the virtual reality scene or the mixed reality scene.

At present, a combination of the spatiotemporal analysis and the virtual reality scene or the mixed reality scene has not yet started. Additionally, a current virtual reality or mixed reality spatial positioning technology, such as laser positioning, infrared positioning, ultrasonic positioning and etc., can only calibrate a position of the subject and an interactive device in a virtual three-dimensional space in real time, and are limited to a construction and a display of the virtual reality scene or the mixed reality scene. Spatial information of the subject moving in the virtual reality scene or the mixed reality scene cannot be recorded comprehensively, completely and systematically.

SUMMARY

In order to record a spatial information of a subject moving in a virtual reality scene or a mixed reality scene comprehensively, completely and systematically, the present application provides a method, apparatus, device, system and storage medium for collecting spatiotemporal behaviors and generating a spatiotemporal behavior track.

First, the present application provides the method for collecting and generating spatiotemporal behavior track, adopting the following technical solutions.

The method for collecting and generating spatiotemporal behavior track includes:

obtaining a first time series containing a plurality of sampling points, which are projection points of a reality display device;

taking any one of the plurality of sampling points as a current sampling point; setting a window time based on a sampling time of the current sampling point, and finding a first sampling point and a last sampling point within the window time; taking a first position as a center of a circle, which is a center point of the reality display device corresponding to the current sampling point, and calculating an angular speed between the first sampling point and the last sampling point; if the angular speed is greater than a preset angular speed threshold, taking the current sampling point as a displacement point;

processing the plurality of sampling points as described above to obtain a second time series containing a plurality of displacement points;

drawing a moving track map based on the second time series.

In the above technical solution, based on the plurality of sampling points indicating the position of the subject, evaluating each sampling point by setting the window time, the angular speed and other parameters, and quickly removing the sampling point with small deviation, and screening out the displacement point meeting requirement, then drawing the moving track map through the displacement point. Thus, it can not only improve a drawing efficiency, but also clearly describe a moving track of the subject in the virtual reality scene or the mixed reality scene, so as to comprehensively, completely and systematically record the spatial information of the subject moving in the virtual reality scene or the mixed reality scene, and provide data support for subsequent spatiotemporal data analysis, so as to analyze a user satisfaction in the virtual reality scene or the mixed reality scene.

In some embodiments, a middle time of the window time is the sampling time of the current sampling point, and the window time includes the sampling times corresponding to at least three sampling points.

In some embodiments, for any one of the plurality of sampling points, before the setting the window time based on the sampling time of the current sampling point, further includes:

if the time interval between two adjacent sampling points in the first time series is within a preset interval, performing filling data in a gap between two adjacent sampling points.

In the above technical solution, filling data for an invalid sampling interval where no data of the position of the subject is collected, so as to ensure a continuity of the moving track of the subject.

In some embodiments, the filling data in a gap between two adjacent sampling points includes:

filling the sampling points at a line connecting two adjacent sampling points according to a first interval; the first interval is calculated according to a distance between two adjacent sampling points and a number of invalid sampling points between two adjacent sampling points; the number of invalid sampling points is calculated according to the time interval between two adjacent sampling points and a sampling period.

In some embodiments, before the drawing the moving track map based on the second time series, further includes:

if a time interval between two adjacent displacement points in the second time series is less than a first time interval threshold, determining whether an included angle between two connecting lines respectively connecting two adjacent displacement points with a second position is greater than a preset angle threshold. Among them, the second position is the center point of the reality display device corresponding to a displacement point with a later sampling time in the two adjacent displacement points;

if yes, merging the two adjacent displacement points to a new displacement point.

In the above technical solution, merging the two adjacent displacement points meeting an angular requirement can not only reduce a calculation volume of a subsequent data, but also ensure that the selected displacement points can accurately indicate an actual movement of the subject.

In some embodiments, before the drawing the moving track map based on the second time series, further includes:
  taking any one of the displacement points as a current displacement point; if a duration time for which a subject is located at the current displacement point is less than a second time interval threshold, discarding the current displacement point; the duration time of the subject at the current displacement point is a time interval between the sampling time of the current displacement point and that of the next displacement point.

In the above technical solution, if the duration time of the subject at the current displacement point does not meet requirement, it is identified as a useless displacement point, and a data volume can be reduced to ensure calculation ability of a computer.

In some embodiments, the moving track map includes a displacement route map; the drawing the moving track map based on the plurality of displacement points includes:
  obtaining a display parameter of each displacement point, which includes color, direction and area; in particular, the direction is pointing from the previous displacement point to the current displacement point, the area is positively correlated with the duration time for which a subject is located at the current displacement point; the duration time of the subject at the current displacement point is a time interval between the sampling time of the current displacement point and that of the next displacement point;
  generating the displacement route map based on the display parameter of each displacement point.

In some embodiments, the moving track map includes a track thermogram; the drawing the moving track map based on the plurality of displacement points includes:
  obtaining at least one SOI region, and counting a number of the displacement points in at least one SOI region;
  for any one of the SOI regions, determining a color intensity value based on the duration time for which a subject is located at each displacement point and the number of the displacement points in a unit area, and drawing the track thermogram in a current SOI region based on the color intensity value; in particular, the duration time of the subject at each displacement point is a time interval between the sampling time of each displacement point and that of the next displacement point.

In some embodiments, after the drawing the moving track map based on the plurality of displacement points, further includes:
  obtaining an eye movement data and/or a physiological sign data of a subject at each displacement point, and marking the eye movement data and/or the physiological sign data of each displacement point on the moving track map;

in particular, the physiological sign data includes at least one of electroencephalogram (EEG), electromyography (EMG), heart rate, blood pressure, pulse, body temperature and respiratory rate.

In some embodiments, further includes:
  obtaining at least one SOI region;
  extracting the displacement point in at least one SOI region, and generating an access evaluation data of each SOI region; normalizing a number of access, a total staying time and a proportion of access time in the access evaluation data of each SOI region, and then calculating an access evaluation indicator of each SOI region based on a weighted sum; and/or,
  extracting the eye movement data in at least one SOI region, and generating a gaze evaluation data of each SOI region; normalizing a total gaze duration time, a number of gaze and a proportion of gaze time in the gaze evaluation data of each SOI region, and then calculating a gaze evaluation indicator of each SOI region based on a weighted sum; and/or,
  extracting the physiological sign data in at least one SOI region, and generating a physiological sign change evaluation data of each SOI region; normalizing the physiological sign change evaluation data of each SOI region, and then calculating a physiological sign change evaluation indicator of each SOI region based on a weighted sum.

Second, the present application provides an apparatus for collecting spatiotemporal behaviors and generating a spatiotemporal behavior track, adopting the following technical solutions.

The apparatus for collecting spatiotemporal behaviors and generating a spatiotemporal behavior track includes:
  a sampling point obtaining module, configured for obtaining a first time series containing a plurality of sampling points, which are projection points of a reality display device;
  a displacement point obtaining module, configured for: taking any one of the plurality of sampling points as a current sampling point; setting a window time based on a sampling time of the current sampling point, and finding a first sampling point and a last sampling point within the window time; taking the first position as a center of a circle, which is a center point of the reality display device corresponding to the current sampling point, and calculating an angular speed between the first sampling point and the last sampling point; if the angular speed is greater than a preset angular speed threshold, taking the current sampling point as a displacement point; processing the plurality of sampling points as described above to obtain a second time series containing a plurality of displacement points; and,
  a drawing module, configured for drawing a moving track map based on the second time series.

Third, the present application provides an electronic device, adopting the following technical solutions.

The electronic device includes a memory and a processor; the memory can be configured for storing a computer program capable of being loaded by the processor and executing any one of the methods as described in the first aspect.

Fourth, the present application provides a system for collecting spatiotemporal behaviors and generating a spatiotemporal behavior track, adopting the following technical solutions.

The system for collecting spatiotemporal behaviors and generating a spatiotemporal behavior track includes a reality display device and an electronic device as described in the third aspect;

the reality display device is configured for collecting a coordinate of a projection point of the reality display device based on a preset sampling frequency, and sending a coordinate of the projection point of the reality display device to the electronic device;

the electronic device is configured for obtaining the coordinate of the projection point of the reality display device, and generating a first time series containing a plurality of sampling points based on the coordinate of the projection point of the reality display device.

Fifth, the present application provides a computer readable storage medium, adopting the following technical solutions.

The computer readable storage medium is configured for storing a computer program capable of being loaded by a processor and executing any one of the methods as described in the first aspect.

DETAILED DESCRIPTION

An embodiment of the present application is further described in detail in combination with drawings above.

First, main terms involved in the embodiment of the present application and involved virtual reality or mixed reality positioning technology are described briefly, and the involved main terms are as follows.

Subject: an objective subject operating in a virtual reality scene or mixed reality scene.

SOI (Signal Of Interest): a specific area in the virtual reality scene or the mixed reality scene, which is the focus of a researcher.

Virtual reality scene: in a virtual reality system, a three-dimension scene or a two-dimension scene where the subject visits and interacts, such as three-dimension model scene, panorama picture, panorama video and etc.

Mixed reality scene: in a mixed reality system, a new visual environment generated by combining a reality scene and a virtual scene.

Projection point of reality display device: the reality display device includes a VR (Virtual Reality) display device and a MR (Mediated Reality) display device; in the virtual reality scene, emitting a vertical ray from a center point of the VR display device to a ground of the virtual reality scene, and a point where the ray contacts a ground grid is the projection point of the VR display device; in the mixed reality scene, emitting the vertical ray from the center point of the MR display device to the ground of the mixed reality scene, and the point where the ray contacts the ground grid is the projection point of the MR display device.

Displacement route map: the displacement route map of the subject in the virtual reality scene or the mixed reality scene mapped according to the projection point of reality display device on the ground of the virtual reality scene or the mixed reality scene at different times and presented in a form of arrow.

The virtual reality positioning technology or the mixed reality positioning technology mainly includes the following:

Laser positioning: using a positioning light tower to emit lasers scanning in both horizontal and vertical directions to a positioning space; the positioned reality display device is provided with a plurality of laser induction receivers; calculating a coordinate of the subject by calculating an angle difference between two light beams reaching a positioning object.

Infrared positioning: shooting an indoor scene by using a camera, and tracking an active luminous marker point on the reality display device, and distinguishing different positioning points by different colors.

Ultrasonic positioning: an ultrasonic positioning system includes a transponder and main range finder, and the transponder is provided at a plurality of places indoors; the reality display device is provided with the main range finder, and measures distances between the reality display device and at least three transponders by emitting a radio wave and using a principle of sonar. Then, on a premise that a transponder coordinate is known, a position of the main range finder is calculated by using a triangle algorithm, that is, an indoor positioning of the subject is completed.

In a specific scene, based on a research on the spatiotemporal behavior of an individual in the VR virtual supermarket environment, different product regions of the supermarket are divided into different SOI interest regions. By studying a walking track of the individual in the supermarket and an order of entering different interest regions, differences of a consumption behavior track and a stay time of individuals of different genders in different spatiotemporal positions can be analyzed.

The embodiments of the present application disclose a method for collecting spatiotemporal behaviors and generating a spatiotemporal behavior track, which is used in an electronic device. The electronic device includes but is not limited to: a mobile terminal such as a mobile phone, a laptop, a digital radio receiver, a PDA (personal digital assistant), a PAD (tablet personal computer), a PMP (portable multimedia player), a vehicular terminal (such as vehicular navigation terminal) and etc., and a fixed terminal such as a digital TV, a desktop computer and etc., and a server and etc.

Figure 1:
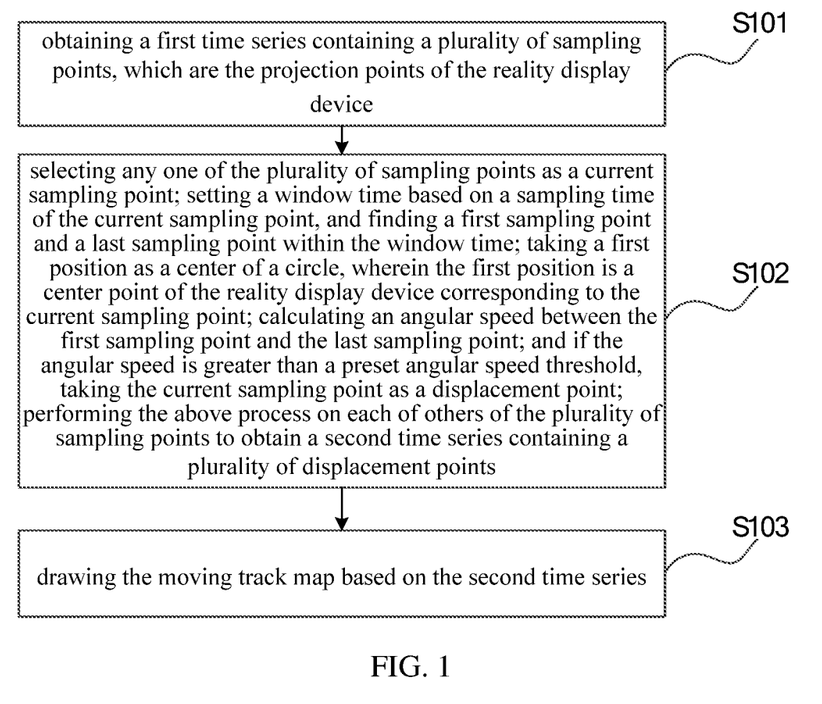
FIG. 1 is a flow diagram of a method for collecting spatiotemporal behaviors and generating a spatiotemporal behavior track according to embodiments of the present application.

Referring to FIG. 1, the method for collecting spatiotemporal behaviors and generating a spatiotemporal behavior track mainly includes the following steps.

Step S101, obtaining a first time series containing a plurality of sampling points, which are the projection points of the reality display device.

Specifically, the reality display device worn by the subject collects a position data of the subject by using a built-in position sensor thereof according to a preset sampling frequency, and sends the position data to the electronic device in real time by wireless or wired transmission. Then, the electronic device arranges the received position data in order of sampling time to obtain the first time series.

In this embodiment, the position sampling point corresponds to the position data one by one. The position data of the subject is the coordinate of the projection point of the reality display device worn by the subject. The sampling point is the projection point of the reality display device at the corresponding sampling time. A method for obtaining the coordinate can refer to the laser, infrared, ultrasonic and other positioning technologies mentioned above. The reality display device can be but is not limited to VR helmet, VR glasses and other virtual reality devices. For this, this embodiment is not specifically limited.

Step S102, taking any one of the plurality of sampling points as a current sampling point; setting a window time based on the sampling time of the current sampling point, and finding a first sampling point and a last sampling point within the window time; taking a first position as a center of a circle, which is the center point of the reality display device corresponding to the current sampling point, and calculating an angular speed between the first sampling point and the last sampling point; if the angular speed is greater than a preset angular speed threshold, taking the current sampling point as a displacement point; processing the plurality of sampling points as described above to obtain a second time series containing a plurality of displacement points.

Generally, there are many sampling points in the first time series. In order to reduce a data volume recorded and analyzed by a system, it is necessary to screen out a representative displacement point. The representative displacement point is the sampling point with large deviation amplitude of the subject. Because the sampling point with small relative displacement is not conducive to a subsequent drawing of a moving track, which not only affects a drawing efficiency, but also leads to a problem of unclear description of the moving track of subject in the virtual reality scene or the mixed reality scene. Thus, the sampling points with very small relative displacement can be ignored. Before drawing a moving track map, it is needed to filter all of the sampling points first and select the displacement points that can be used to draw the moving track map.

Due to a great difference of heights of the subjects, their step size is greatly affected by their height, if a displacement distance of the subject is directly used to determine a deviation degree of the subject, it is easy to cause a deviation in a result. Compared with a determining method of the displacement distance, the angular speed can be used in the embodiments of the present application to quickly determine the deviation degree of the subject, effectively avoid a height factor, and more accurately evaluate the deviation degree of the sampling point.

In Step S102, a middle time of the window time is the sampling time of the current sampling point. The window time includes the sampling times corresponding to at least three sampling points, that is, the window time should not be less than two sampling periods (2T).

Of course, the window time also needs to be set an upper limit value, which can be 4T, 6T or 8T, that is, the window time should not be greater than 4T, 6T or 8T.

In one embodiment, the first sampling point can be the sampling point corresponding to a minimum sampling time within the window time, and the last sampling point can be the sampling point corresponding to a maximum sampling time within the window time. Alternatively, the first sampling point can be the sampling point corresponding to the maximum sampling time within the window time, and the last sampling point can be the sampling point corresponding to the minimum sampling time within the window time.

Figure 2:
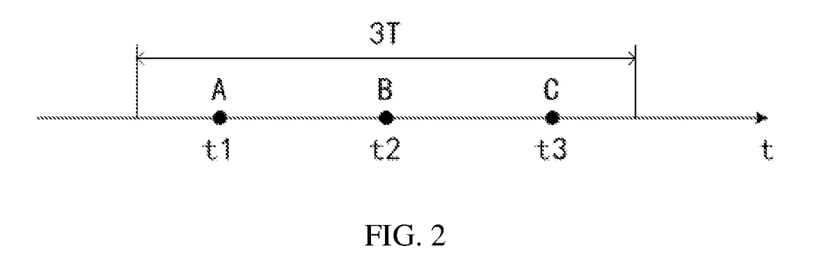
FIG. 2 is a diagram of a time distribution of sampling times with 3T as a window time according to embodiments of the present application.

FIG. 2 shows a time distribution of the sampling points with 3T as the window time. Referring to FIG. 2, there are three sampling points A, B and C within this window time. Among them, a sampling time $t_2$ of the sampling point B is the middle time of the window time, and the sampling point A is the first sampling point within the window time, and the sampling point B is the last sampling point within the window time. A sampling time $t_1$ of the sampling point A is earlier than a sampling time $t_3$ of the sampling point C.

In step S102, a position of a first device corresponding to the current sampling point is the center point of the reality display device worn by the subject. Connecting the center point with the first sampling point and the last sampling point with straight lines respectively, and the two lines intersect to form a second included angle. Calculating the angular speed between the first sampling point and the last sampling point according to the second included angle and a time interval between the first sampling point and the last sampling point.

Figure 3:
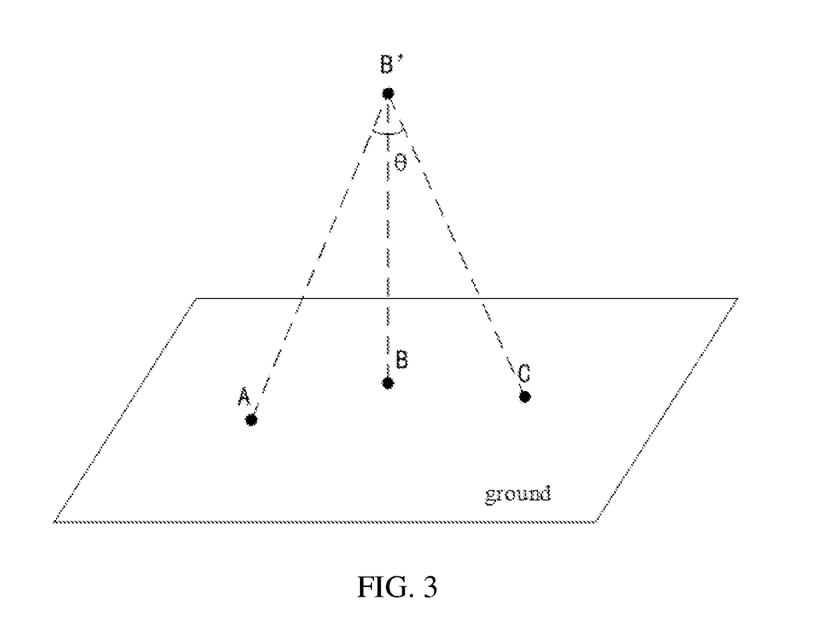
FIG. 3 is a diagram of a space distribution of sampling times with 3T as a window time according to embodiments of the present application.

FIG. 3 shows the spatial distribution of the three sampling points shown in FIG. 2. Referring to FIG. 3, a point B' is the first position corresponding to the sampling point B, and a line AB' intersects with a line B'C to form an included angle θ. Then, calculating the angular speed between the sampling point A and the sampling point C according to $\omega = \theta/(t_3 - t_1)$.

In one embodiment, the threshold of the preset angular speed can be set according to experience, for example 35°/s, and for this, the embodiment is not specifically limited.

Step S103, drawing the moving track map based on the second time series.

As one optional embodiment of the present application, due to the problem of the reality display device, the position data of the subject may not be collected at some sampling times in step S101, thus there will be a plurality of invalid sampling points, and the plurality of sampling points obtained in step S101 may be discontinuous.

It should be understood that, if the data is missed, the finally obtained moving track will deviate greatly from an actual situation, which is not conducive to a subsequent data analysis. Thus, a gap part needs to be filled as follows.

If the time interval between two adjacent sampling points in the first time series is within a preset interval, filling data in a gap between two adjacent sampling points.

In particular, the two adjacent sampling points in the first time series mean that the sampling time of the two sampling points is adjacent. A lower limit value of the preset interval can be T, and an upper limit value thereof can be same as an interval parameter P of the reality display device. The interval parameter is obtained based on a displacement algorithm of the reality display device, that is, as long as the time interval between two adjacent sampling points in the time series is (T, P], the sampling point can be inserted between these two adjacent sampling points.

Optionally, filling the sampling points at a line connecting two adjacent sampling points according to a first interval. The first interval is calculated according to a distance between two adjacent sampling points and a number of invalid sampling points between two adjacent sampling points. The number of invalid sampling points is calculated according to the time interval between two adjacent sampling points and the sampling period.

Figure 4:
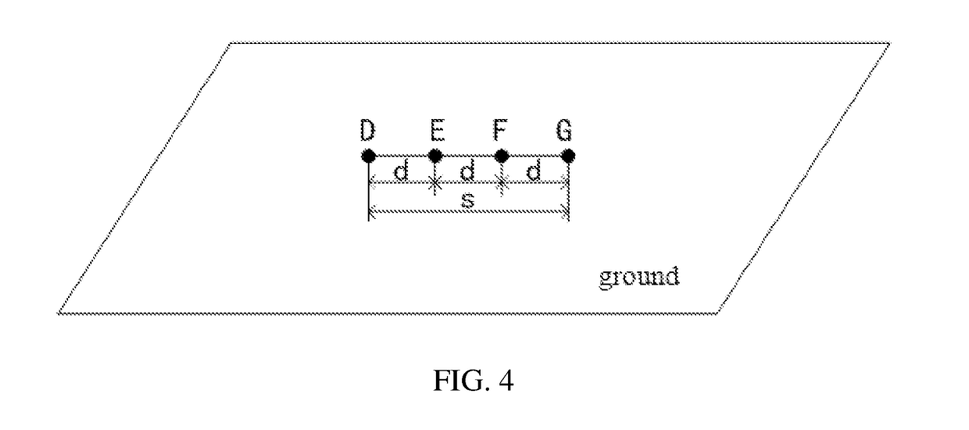
FIG. 4 is a diagram of filling sampling points according to embodiments of the present application.

Referring to FIG. 4, connecting the sampling points D and G with the line, and calculating the first interval according to a formula d=s/(n+1). In the formula, s is a linear distance between the sampling points D and G, and n is the number of invalid sampling points between the sampling points D and G. It is known that the time interval between two adjacent sampling points D and G is 3T, thus it can be known that there are two invalid sampling points between the sampling points D and G, that is, n=2. According to the calculated first interval d, successively inserting the sampling points E and F at the line DG. The distance between any two adjacent sampling points among the sampling points D, E, F and G after data filling is the first interval d.

The plurality of sampling points after filling are arrayed according to the order of the sampling time by using the electronic device to obtain the first time series.

It should be noted that, if the time interval between two adjacent sampling points in the first time series is equal to T, it indicates there is no invalid sampling point between two adjacent sampling points. If the time interval between two adjacent sampling points in the first time series is greater than the upper limit P of the preset interval, it should be treated as a breakpoint without filling the sampling points.

As one optional embodiment of the present application, if the two adjacent displacement points in the second time series are too close, a generation of the subsequent moving track map will be affected, thus it is necessary to merge them. Similarly, compared with the determining method of the displacement distance, the embodiments of the present application uses an angle factor to determine the deviation degree of the subject, which can effectively avoid the height factor and can determine the deviation degree of the displacement point more accurately. The specific method is as follows.

If the time interval between two adjacent displacement points in the second time series is less than a threshold of the first time interval, determining whether an included angle between two connecting lines respectively connecting two adjacent displacement points with a second position is greater than a preset angle threshold. Among them, the second position is the center point of the reality display device corresponding to a displacement point with a later sampling time in the two adjacent displacement points. If yes, merging the two adjacent displacement points to a new displacement point.

Figure 5:
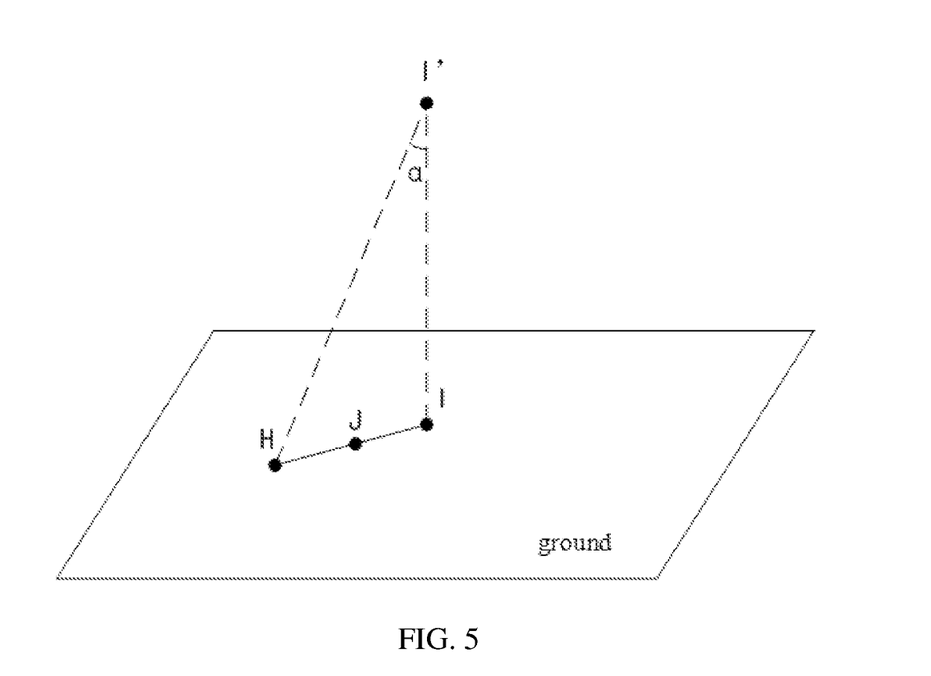
FIG. 5 is a diagram of merging displacement points according to embodiments of the present application.

Referring to FIG. 5, for the two adjacent displacement points H and I in the second time series, a sampling time t4 of the displacement point H is earlier than a sampling time t5 of the displacement point I. A center point I' of the reality display device where the subject is located at the displacement point I is the second position. An included angle between two lines respectively connecting the center point I' with the displacement points H and I is a. If a is less than the threshold of the first time interval, merging the displacement points H and I to the new displacement point.

The specific method of merging can be as follows: connecting the displacement points H and I, and taking a middle point J as the new displacement point, then removing the displacement points H and I. A sampling time t6 of the displacement point J is a middle time of the sampling time t4 of the displacement point H and the sampling time t5 of the displacement point I.

In this embodiment, the threshold of the first time interval may be the same as the interval parameter P of the reality display device.

As one optional embodiment of the present application, in order to reduce the data volume and improve drawing efficiency, the displacement points with short staying time can be discarded. Additionally, if the subject stays at one displacement point for a longer time, it indicates that the subject is more interested in this location. User interest and satisfaction are objectives of studying the moving track of the subject, thus the displacement points with very short staying time can be discarded. The specific method is as follows.

For any one of the plurality of displacement points, taking any one of the displacement points as a current displacement point. If a duration time of the subject at the current displacement point is less than a second time interval threshold, discarding the current displacement point. The duration time of the subject at the current displacement point is a time interval between the sampling time of current displacement point and that of the next displacement point, which is in the second time series and adjacent to the current displacement point, and has a later sampling time.

In this embodiment, the threshold of the second time interval is set according to experience, sun as 60 ms, and for this, the embodiment is not specifically limited.

It should be noted that, if the displacement points need to be merged, they need to be discarded after merging.

In this embodiment, the moving track map is used to describe the moving track of the subject in the virtual reality scene or the mixed reality scene, so as to analyze the spatiotemporal behavior of the subject in the virtual reality scene or the mixed reality scene, which can include but is not limited to the displacement route map and a track thermogram. For this, the embodiment is not specifically limited.

The drawing of the moving track map based on the plurality of displacement points is described below by taking the displacement route map and the track thermogram as examples.

When drawing the displacement route map through the plurality of displacement points, first, obtaining a display parameter of each displacement point, then generating the displacement route map based on the display parameter of each displacement point. Each displacement point is marked with the same figure, such as an arrow. The display parameter is color, direction and area parameters of a figure.

Figure 6:
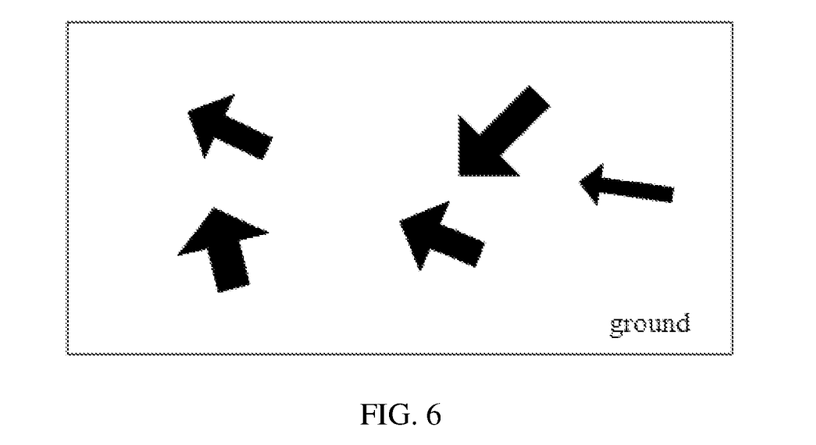
FIG. 6 is a planar diagram of one of displacement route maps according to embodiments of the present application.

Referring to FIG. 6, the direction of the arrow is used to indicate a moving trend of the subject, that is, always pointing from a previous displacement point to the current displacement point, and the sampling time of the previous displacement point is earlier than that of the current displacement point. The area of the arrow is positively correlated with a duration time of the subject at the current displacement point, that is, the longer the duration time of the current displacement point, the larger the area of the arrow. For example, the area of the arrow will be expanded by 10% for each is increase of the duration time of the subject at the current displacement point. The color of the arrow can be preset, and the color of the arrow of different subjects can be different to distinguish the moving track of different subjects.

By setting rules of the above display parameters, the moving tracks of the different subjects can be observed more intuitively, and the staying time of each subject in each area of the virtual reality scene or the mixed reality scene can be compared with each other, so as to subsequently analyzing the interest degree of the subjects.

When drawing the track thermogram through the plurality of displacement points, first obtaining at least one SOI region in the virtual reality scene or the mixed reality scene, and counting a number of the displacement points in at least one SOI region. For any one of the SOI regions, determining a color intensity value based on the duration time of the subject at each displacement point and the number of the displacement points in a unit area, and drawing the track thermogram in the current SOI region based on the color intensity value. In particular, the duration time of the subject at each displacement point is the time interval between the sampling time of each displacement point and that of the next displacement point.

The SIM regions can be sequenced based on the number of the displacement points in the region and the total duration time of the displacement points in the region. Specifically, setting a scoring standard for the number of the displacement points in the region and the total duration time of the displacement points in the region, and sequencing according to a score of each region, and the color intensity value of the SIM region with high scores is high.

In summary, the color intensity value of the SIM region with more displacement points and/or longer duration time of the displacement point is higher than that of other SIM regions. According to the color intensity value, it can be quickly observed which one SIM region the subject is more interested in.

In this embodiment, the displacement route map and the track thermogram can be loaded in two-dimension or three-dimension map.

It should be noted that, an adjacent relationship described in the embodiments of the present application refers to the adjacent relationship in time concept, not in the space concept.

As one optional embodiment of the present application, after Step S103, an eye movement data and/or a physiological sign data of the subject at each displacement point also can be obtained, and the eye movement data and/or the physiological sign data of each displacement point are marked on the moving track map. In particular, the physiological sign data includes at least one of electroencephalogram (EEG), electromyography (EMG), heart rate, blood pressure, pulse, body temperature and respiratory rate.

Further, when drawing the track thermogram, obtaining at least one SOI region of the virtual reality scene or the mixed reality scene. At this time, processing the displacement point and/or the eye movement data and/or the physiological sign data in each SOI region to obtain the various evaluation indicators in each SOI region. The specific method is as follows.

(1) Extracting the displacement point in at least one SOI region, and generating an access evaluation data of each SOI region. Normalizing a number of access, a total staying time and a proportion of access time in the access evaluation data of each SOI region, and then calculating an access evaluation indicator of each SOI region based on a weighted sum.

Dimensions of the number of access, the total staying time and the proportion of access time are different, after normalizing (the data can be mapped to a range of 0-1), obtaining the access evaluation indicator based on a weighted sum. The higher a value of the access evaluation indicator, the higher an interaction degree between the subject and the SOI region, and the higher an attraction of the SOI region to the subject.

(2) Extracting the eye movement data in at least one SOI region, and generating a gaze evaluation data of each SOI region. Normalizing a total gaze duration time, a number of gaze and a proportion of gaze time in the gaze evaluation data of each SOI region, and then calculating a gaze evaluation indicator of each SOI region based on a weighted sum.

Dimensions of the total gaze duration time, the number of gaze and the proportion of gaze time are different, after normalizing (the data can be mapped to a range of 0-1), obtaining the gaze evaluation indicator based on a weighted sum. The higher a value of the gaze evaluation indicator, the higher the interaction degree between the subject and the SOI region, and the higher the attraction of the SOI region to the subject.

(3) Extracting the physiological sign data in at least one SOI region, and generating a physiological sign change evaluation data of each SOI region. Normalizing the physiological sign change evaluation data of each SOI region, and then calculating a physiological sign change evaluation indicator of each SOI region based on a weighted sum.

Taking EEG and respiratory rate as examples, a standard deviation of EEG signal and respiratory rate can be used as an EEG change data and respiratory rate change data, after normalizing (the data can be mapped to a range of 0-1), obtaining the physiological sign change evaluation indicator. The higher a value of the physiological sign change evaluation indicator, the higher the stimulation degree of the SOI region to the emotion of the subject, which is the higher the attraction of the SOI region to the subject.

In this optional embodiment, the access evaluation data, the gaze evaluation data and/or physiological sign change evaluation data of each SOI region are used as evaluation elements to associate with set evaluation indicators of each SOI region, so as to obtain the corresponding evaluation results.

Figure 7:
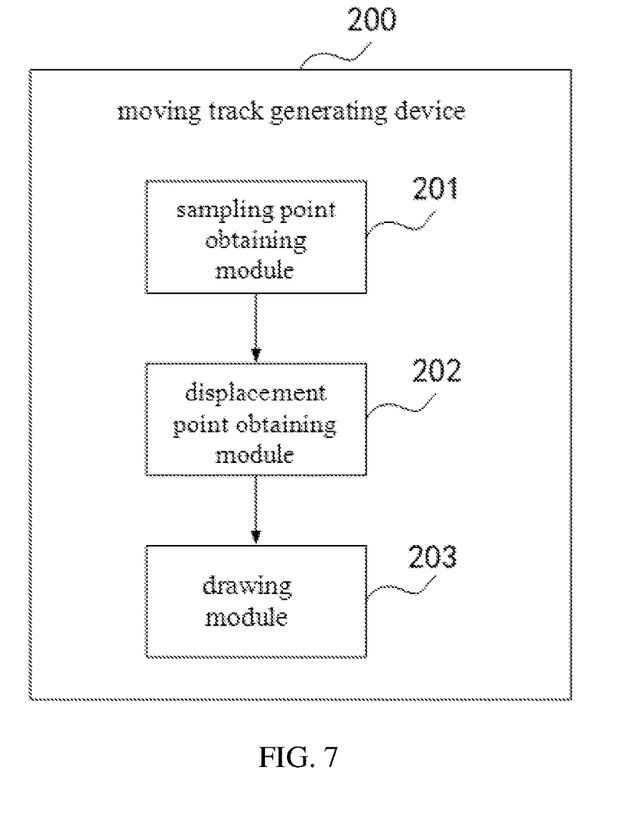
FIG. 7 is a block diagram of a structure of an apparatus for collecting spatiotemporal behaviors and generating a spatiotemporal behavior track according to embodiments of the present application.

Referring to FIG. 7, the embodiments of the present application further provide an apparatus for collecting spatiotemporal behaviors and generating a spatiotemporal behavior track, mainly including:

a sampling point obtaining module 201, configured for obtaining the first time series containing a plurality of sampling points, which are the projection points of the reality display device;

a displacement point obtaining module 202, configured for: taking any one of the plurality of sampling points as the current sampling point; setting the window time based on the sampling time of the current sampling point, and finding the first sampling point and the last sampling point within the window time; taking the first position as the center of the circle, which is the center point of the reality display device corresponding to the current sampling point, and calculating the angular speed between the first sampling point and the last sampling point; if the angular speed is greater than the threshold of the preset angular speed, taking the current sampling point as the displacement point; processing the plurality of sampling points as described above to obtain the second time series containing a plurality of displacement points; and, a drawing module 203, configured for drawing the moving track map based on the second time series.

As one optional embodiment of the present application, the middle time of the window time is the sampling time of the current sampling point. The window time includes the sampling times corresponding to at least three sampling points.

As one optional embodiment of the present application, the apparatus further includes a filling module, configured for: for any one of the plurality of sampling points, before setting the window time based on the sampling time of the current sampling point, if the time interval between two adjacent sampling points in the first time series is within the preset interval, filling data in a gap between two adjacent sampling points.

As one optional embodiment of the present application, the filling module is configured for filling the sampling points at the line connecting two adjacent sampling points according to the first interval. The first interval is calculated according to the distance between two adjacent sampling points and the number of invalid sampling points between two adjacent sampling points. The number of invalid sampling points is calculated according to the time interval between two adjacent sampling points and the sampling period.

As one optional embodiment of the present application, the apparatus further includes a merging module, configured for, before drawing the moving track map based on the plurality of displacement points, if the time interval between two adjacent displacement points in the second time series is less than the threshold of the first time interval, determining whether the included angle between the two connecting lines respectively connecting two adjacent displacement points with the second position is greater than the threshold of the preset angle. Among them, the second position is the center point of the reality display device corresponding to a displacement point with a later sampling time in the two adjacent displacement points; if yes, merging the two adjacent displacement points to the new displacement point.

As one optional embodiment of the present application, the apparatus further includes a discarding module, configured for, before drawing the moving track map based on the plurality of displacement points, for any one of the plurality of displacement points, if the duration time of the subject at the current displacement point is less than the threshold of the second time interval, discarding the current displacement point. The duration time of the subject at the current displacement point is the time interval between the sampling time of current displacement point and that of the next displacement point.

As one optional embodiment of the present application, the moving track map includes the displacement route map. The drawing module 203 is specifically configured for obtaining the display parameter of each displacement point, including color, direction and area. In particular, the direction is pointing from the previous displacement point to the current displacement point; the area is positively correlated with the duration time of subject at the current displacement point; the duration time of the subject at the current displacement point is the time interval between the sampling time of the current displacement point and that of the next displacement point. Generating the moving track map based on the display parameter of each displacement point.

As one optional embodiment of the present application, the moving track map includes the track thermogram. The drawing module 203 is specifically configured for obtaining at least one SOI region, and counting the number of the displacement points in at least one SOI region. For any one of the SOI regions, determining the color intensity value based on the duration time of each displacement point and the number of the displacement points in the unit area, and drawing the track thermogram in a current SOI region based on the color intensity value. In particular, the duration time of the subject at each displacement point is the time interval between the sampling time of each displacement point and that of the next displacement point.

As one optional embodiment of the present application, after drawing the moving track map based on the plurality of displacement points, the apparatus further includes a marking module, configured for obtaining the eye movement data and/or the physiological sign data of the subject at each displacement point, and marking the eye movement data and/or the physiological sign data of each displacement point on the moving track map. In particular, the physiological sign data includes at least one of electroencephalogram (EEG), electromyography (EMG), heart rate, blood pressure, pulse, body temperature and respiratory rate.

The optional embodiment also includes:
a SOI region obtaining module, configured for obtaining at least one SOI region;
a first extracting module, configured for: extracting the displacement point in at least one SOI region, and generating the access evaluation data of each SOI region; normalizing the number of access, the total staying time and the proportion of access time in the access evaluation data of each SOI region, and then calculating the access evaluation indicator of each SOI region based on a weighted sum; and/or,
a second extracting module, configured for: extracting the eye movement data in at least one SOI region, and generating the gaze evaluation data of each SOI region; normalizing the total gaze duration time, the number of gaze and the proportion of gaze time in the gaze evaluation data of each SOI region, and then calculating the gaze evaluation indicator of each SOI region based on a weighted sum; and/or,
a third extracting module, configured for: extracting the physiological sign data in at least one SOI region, and generating the physiological sign change evaluation data of each SOI region; normalizing the physiological sign change evaluation data of each SOI region, and then calculating the physiological sign change evaluation indicator of each SOI region based on a weighted sum.

In one embodiment, a unit in any one of the apparatus above can be one or more integrated circuits configured to implement the above method. For example, one or more application specific integrated circuits (ASICs), or one or more digital signal processors (DSPs), or one or more field programmable gate arrays (FPGAs), or a combination of at least two of these integrated circuit forms.

For another example, the unit in the apparatus can be implemented in a form of a scheduler of processing element, which can be a general purpose processor, such as a central processing unit (CPU) or other processors that can call a program. For another example, these units can be integrated together and implemented in a form of a system-on-a-chip (SOC).

In the present application, various possible messages/information/devices/network elements/systems/apparatus/actions/operations/processes/concepts and other kinds of objects are named. It should be understood that, these specific names do not limit the related objects, and can be changed with factors such as scene, context or usage habit. An understanding of a technical meaning of a technical term in the present application should be determined mainly from a function and a technical effect embodied/implemented in a technical solution.

Those skilled in the art can clearly understand that, in order to describe conveniently and simply, the specific working processes of the systems, apparatus and units described above can refer to the corresponding process in the above method embodiments, and will not be repeated here.

In the several embodiments according to the present application, it should be understood that, the disclosed system, device and method can be realized in other ways. For example, the apparatus embodiment described above only is exemplary. For example, a division of the unit is only a logical function division, and there can be another division method in actual implementation, for example, a plurality of units or components can be combined or integrated into another system, or some features can be ignored or not implemented. Additionally, a mutual coupling, direct coupling or communication connection shown or discussed can be an indirect coupling or communication connection by using some interfaces, devices or units, and can be electrical, mechanical or other forms.

The units for separately describing the components may or may not be physically separated, and the components displayed as the unit may or may not be a physical unit, that is, they may be located at one place or distributed in a plurality of network units. Some or all of the units can be selected according to an actual need to achieve a purpose of the embodiments.

It can be realized by those skilled in the art, the units and algorithm steps of each example described in combination with the embodiments disclosed herein can be realized by using an electronic hardware, or a combination of computer software and electronic hardware. Whether these functions are implemented by using the hardware or software depends on a specific application and a design constraint of the technical solution. Different methods can be used for each specific application by a professional technician to realize the described functions, but such implementation should not be considered beyond the scope of the present application.

It should also be understood that, relational terms such as first and second are only used to distinguish one entity or operation from another one entity or operation, and do not necessarily require or imply any such actual relationship or order between these entities or operations. The terms "including", "containing" and any other variation thereof containing non-exclusive inclusion refer to that the process, method, article or device including a series of elements includes not only those elements, but also other elements not explicitly listed, or further includes the elements inherent in this process, method, article or device.

It should be understood that, in each embodiment of the present application, if there is no special description and logical conflict, the terms and/or descriptions of different embodiments are consistent and can be referred to each other. The technical features in different embodiments can be combined to form new embodiments according to an inherent logical relationship thereof.

Figure 8:
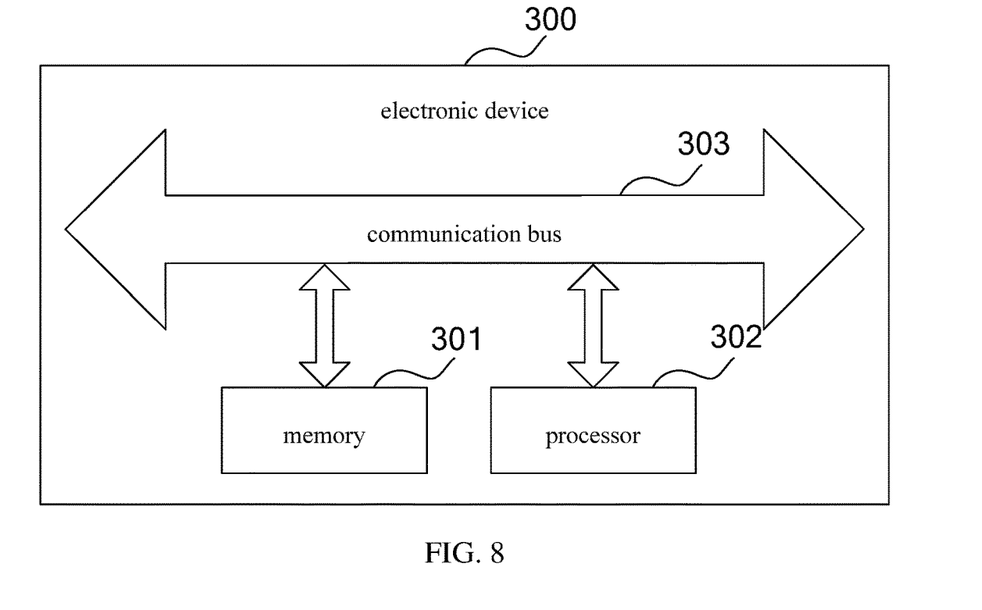
FIG. 8 is a block diagram of a structure of an electronic device according to embodiments of the present application.

Referring to FIG. 8, the embodiments of the present application further provides the electronic device 300, which includes a memory 301, a processor 302 and a communication main line 303.

The memory 301 can be configured for storing an instruction, the program, a code, a code set, or an instruction set, and can includes a storing program area and a storing data area. In particular, the storing program area can store the instruction for implementing an operation system, the instruction for realizing at least one function, the instruction for implementing the method for collecting spatiotemporal behaviors and generating a spatiotemporal behavior track according to the above embodiments, and etc. The storing data area can store the data involved in the method for collecting spatiotemporal behaviors and generating a spatiotemporal behavior track according to the above embodiments, and etc.

The processor 302 can include one or more processing cores, and calls the data stored in the memory 301 and executing various functions and processing data of the present application by running or executing the instruction, the program, the code set or the instruction set stored in the memory 301. The processor 302 can be at least one of the application specific integrated circuit (ASIC), the digital signal processor (DSP), a digital signal processing device (DSPD), a programmable logic device (PLD), the field programmable gate array (FPGA), the central processing unit (CPU), a controller, a micro controller and a microprocessor. It should be understood that, for different devices, the electronic devices used to realize the functions of the processor 302 can also be others, and for this, the embodiment is not specifically limited.

The communication main line 303 can further includes an access for transmitting information among the above components, and can be a peripheral component interconnect (PCI) main line, an extended industry standard architecture (EISA) main line and etc. The communication main line 303 can be divided into an address main line, a data main line, a control main line and etc. For a convenient representation, only one double arrow is used in FIG. 3, but it does not mean that there is only one main line or one type of main line.

In particular, the electronic device 300 includes but is not limited to the mobile phone, the laptop, the digital radio receiver, the PDA (personal digital assistant), the PAD (tablet personal computer), the PMP (portable multimedia player), the vehicular terminal (such as vehicular navigation terminal) and etc., and the fixed terminal such as the digital TV, the desktop computer and etc., and the server and etc. The electronic device 300 shown in FIG. 8 is only an example, and shall not limit the functions and a use scope of the embodiments in the present application.

Figure 9:
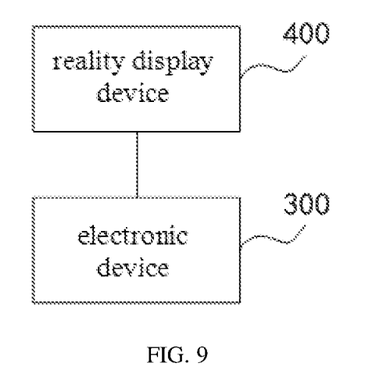
FIG. 9 is a block diagram of a structure of a system for collecting spatiotemporal behaviors and generating a spatiotemporal behavior track according to embodiments of the present application.

Referring to FIG. 9, the embodiments in the present application also provides a system for collecting spatiotemporal behaviors and generating a spatiotemporal behavior track, including the reality display device 400 and the electronic device 300. In particular, the reality display device 400 is configured for collecting the coordinate of the projection point of the reality display device 400 based on the preset sampling frequency, and sending the position data to the electronic device 300.

The electronic device 300 is configured for: obtaining the coordinate of the projection point of the reality display device 400, and generating the first time series containing a plurality of sampling points based on the coordinate of the projection point of the reality display device 400; for any one of the plurality of sampling points, setting the window time based on the sampling time of the current sampling point, and finding the first sampling point and the last sampling point within the window time; taking a first position as the center of the circle, which is the center point of the reality display device corresponding to the current sampling point, and calculating an angular speed between the first sampling point and the last sampling point; if the angular speed is greater than a threshold of the preset angular speed, taking the current sampling point as the displacement point; processing the plurality of sampling points as described above to obtain the second time series containing a plurality of displacement points; drawing and displaying the moving track map in the virtual reality scene or the mixed reality scene based on the plurality of displacement points.

Based on the plurality of sampling points indicating the position of the subject, evaluating each sampling point by setting the window time, the angular speed and other parameters, and quickly removing the sampling point with small deviation, and screening out the displacement point meeting requirement, then drawing the moving track map through the displacement point. Thus, it can not only improve the drawing efficiency, but also clearly describe the moving track of the subject in the virtual reality scene or the mixed reality scene, so as to comprehensively, completely and systematically record the spatial information of the subject moving in the virtual reality scene or the mixed reality scene, and provide data support for subsequent spatiotemporal data analysis, so as to analyze a user satisfaction in the virtual reality scene or the mixed reality scene.

The technical solution of the present application essentially, or the part contributing to the existing technology or the part of the technical solution can be embodied in a form of software products. The computer software product is stored in a computer readable storage medium, including a number of instructions to make a computer device (may be a personal computer, the server, or the network device, etc.) to execute all or part of the steps of the method described in each embodiment of the present application. However, the computer readable storage medium mentioned above includes: u-disc, mobile hard disk, read-only memory (ROM), random access memory (RAM), magnetic disc or disc and other various medium which can store the program code.

The examples of the specific embodiments are all better examples of the present application, and do not limit the protection scope of the application. Therefore, the equivalent changes made according to the structure, shape, principle of the application should fall in the protection scope of the present application.

What is claimed is:

1. A method for collecting spatiotemporal behaviors and generating a spatiotemporal behavior track, comprising:
    obtaining a first time series containing a plurality of sampling points, wherein the plurality of sampling points are projection points of a reality display device;
    selecting any one of the plurality of sampling points as a current sampling point; setting a window time based on a sampling time of the current sampling point, and finding a first sampling point and a last sampling point within the window time, wherein a middle time of the window time is the sampling time of the current sampling point, and the window time comprises sampling times corresponding to at least three sampling points of the plurality of sampling points; connecting a center point of the reality display device with the first sampling point and the last sampling point with straight lines respectively to form a first included angle; calculating an angular speed between the first sampling point and the last sampling point according to the first included angle and a time interval between the first sampling point and the last sampling point; and when the angular speed is greater than a preset angular speed threshold, taking the current sampling point as a displacement point;
    performing the above process on each of others of the plurality of sampling points to obtain a second time series containing a plurality of displacement points; and
    drawing a moving track map based on the second time series.

2. The method according to claim 1, wherein, before the setting the window time based on the sampling time of the current sampling point, the method further comprises:
    when a time interval between two adjacent sampling points in the first time series is within a preset interval, filling data in a gap between the two adjacent sampling points.

3. The method according to claim 2, wherein, the filling data in the gap between the two adjacent sampling points comprises:
    filling sampling points on a line connecting the two adjacent sampling points at a first interval; the first interval is calculated based on a distance between the two adjacent sampling points and a number of invalid sampling points between the two adjacent sampling points; the number of invalid sampling points is calculated based on the time interval between the two adjacent sampling points and a sampling period.

4. The method according to claim 1, wherein, before the drawing the moving track map based on the second time series, the method further comprises:
    when a time interval between two adjacent displacement points in the second time series is less than a first time interval threshold, determining whether a second included angle between two connecting lines respectively connecting the two adjacent displacement points with the center point of the reality display device is greater than a preset angle threshold; wherein, the center point of the reality display device is a center point of the reality display device corresponding to a displacement point with a later sampling time in the two adjacent displacement points; and
    when the second included angle between the two connecting lines respectively connecting the two adjacent displacement points with the center point of the reality display device is greater than the preset angle threshold, merging the two adjacent displacement points to a new displacement point.

5. The method according to claim 1, wherein, before the drawing the moving track map based on the second time series, the method further comprises:
    taking any one of the plurality of displacement points as a current displacement point; when a duration time for which a subject is located at the current displacement point is less than a second time interval threshold, discarding the current displacement point; the duration time for which the subject is located at the current displacement point is a time interval between a sampling time of the current displacement point and a sampling time of a next displacement point.

6. The method according to claim 1, wherein, the moving track map comprises a displacement route map; the drawing the moving track map based on the second time series comprises:
    obtaining a display parameter of each of the plurality of displacement points, wherein, the display parameter comprises color, direction and area, the direction points from a previous displacement point to a current displacement point, the area is positively correlated with a duration time for which a subject is located at the current displacement point; the duration time for which the subject is located at the current displacement point is a time interval between a sampling time of the current displacement point and a sampling time of a next displacement point; and generating the displacement route map based on the display parameter of each of the plurality of displacement points.

7. The method according to claim 1, wherein, the moving track map comprises a track thermogram; the drawing the moving track map based on the second time series comprises:

obtaining at least one signal of interest (SOI) region, and counting a number of displacement points in the at least one SOI region; and for any one of the at least one SOI region, determining a color intensity value based on a duration time for which a subject is located at each of the plurality of displacement points and a number of the displacement points in a unit area, and drawing the track thermogram in a current SOI region based on the color intensity value; wherein, the duration time of the subject at each displacement point of the plurality of displacement points is a time interval between a sampling time of each of the plurality of displacement points and a sampling time of a next displacement point.

8. The method according to claim 1, wherein, after the drawing the moving track map based on the second time series, the method further comprises:

obtaining at least one of eye movement data or physiological sign data of a subject at each of the plurality of displacement points, and marking the at least one of eye movement data or physiological sign data of each of the plurality of displacement points on the moving track map;

wherein, the physiological sign data comprises at least one of electroencephalogram (EEG), electromyography (EMG), heart rate, blood pressure, pulse, body temperature or respiratory rate.

9. The method according to claim 8, further comprising: obtaining at least one signal of interest (SOI) region; and at least one of:

extracting a displacement point of the plurality of displacement points in the at least one SOI region, generating an access evaluation data of each of the at least one SOI region; normalizing a number of access, a total staying time and a proportion of access time in the access evaluation data of each of the at least one SOI region, and calculating an access evaluation indicator of each of the at least one SOI region based on a weighted sum;

extracting the eye movement data in the at least one SOI region, and generating a gaze evaluation data of each of the at least one SOI region, normalizing a total gaze duration time, a number of gaze and a proportion of gaze time in the gaze evaluation data of each of the at least one SOI region, and calculating a gaze evaluation indicator of each of the at least one SOI region based on a weighted sum; or extracting the physiological sign data in the at least one SOI region, generating a physiological sign change evaluation data of each of the at least one SOI region, normalizing the physiological sign change evaluation data of each of the at least one SOI region, and calculating a physiological sign change evaluation indicator of each of the at least one SOI region based on a weighted sum.

10. An apparatus for collecting spatiotemporal behaviors and generating a spatiotemporal behavior track, comprising:

a sampling point obtaining module, configured for obtaining a first time series containing a plurality of sampling points, wherein the plurality of sampling points are projection points of a reality display device;

a displacement point obtaining module, configured for selecting any one of the plurality of sampling points as a current sampling point; setting a window time based on a sampling time of the current sampling point, and finding a first sampling point and a last sampling point within the window time, wherein a middle time of the window time is the sampling time of the current sampling point, and the window time comprises sampling times corresponding to at least three sampling points of the plurality of sampling points; connecting a center point of the reality display device with the first sampling point and the last sampling point with straight lines respectively to form a first included angle; calculating an angular speed between the first sampling point and the last sampling point according to the first included angle and a time interval between the first sampling point and the last sampling point; when the angular speed is greater than a preset angular speed threshold, taking the current sampling point as a displacement point; and performing the above process on each of others of the plurality of sampling points to obtain a second time series containing a plurality of displacement points; and a drawing module, configured for drawing a moving track map based on the second time series.

11. An electronic device, comprising: a memory and a processor; the memory stores a computer program that is configured to be loaded by the processor to implement the method according to claim 1.

12. A system for collecting spatiotemporal behaviors and generating a spatiotemporal behavior track, comprising: the reality display device and the electronic device according to claim 11; wherein, the reality display device is configured for collecting a coordinate of a projection point of the reality display device based on a preset sampling frequency, and sending the coordinate of the projection point of the reality display device to the electronic device;

the electronic device is configured for obtaining the coordinate of the projection point of the reality display device, and generating the first time series containing the plurality of sampling points based on the coordinate of the projection point of the reality display device.

13. A non-transitory computer readable storage medium with a computer program stored thereon, wherein, the computer program is configured to be loaded by a processor and to implement the method according to claim 1.

* * * * *